United States Patent
Park et al.

(10) Patent No.: US 7,443,932 B2
(45) Date of Patent: Oct. 28, 2008

(54) METHOD AND APPARATUS FOR ADJUSTING DATA RECORDED ON OPTICAL DISC

(75) Inventors: Hyun-soo Park, Seoul (KR); Jae-jin Lee, Seoul (KR); Jae-seong Shim, Seoul (KR); You-pyo Hong, Seoul (KR); Ju-han Bae, Seoul (KR); Jae-hoon Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 10/747,312

(22) Filed: Dec. 30, 2003

(65) Prior Publication Data

US 2004/0240365 A1  Dec. 2, 2004

(30) Foreign Application Priority Data

May 26, 2003  (KR)  ........................ 10-2003-0033447

(51) Int. Cl.
*H03D 1/00* (2006.01)
(52) U.S. Cl. ..................................... 375/341; 369/59.22
(58) Field of Classification Search ................. 375/316, 375/340, 341, 362; 369/59.22, 13.01, 59.1, 369/59.21; 714/795.699
See application file for complete search history.

(56) References Cited

U.S. PATENT DOCUMENTS

| | | | |
|---|---|---|---|
| 6,345,023 B1* | 2/2002 | Fushimi et al. | 369/47.36 |
| 6,600,431 B1* | 7/2003 | Shim et al. | 341/59 |
| 2001/0006500 A1* | 7/2001 | Nakajima et al. | 369/47.35 |
| 2001/0016002 A1* | 8/2001 | Shim et al. | 375/232 |

* cited by examiner

*Primary Examiner*—Kevin M Burd
(74) *Attorney, Agent, or Firm*—Stein, McEwen & Bui, LLP

(57) ABSTRACT

A method and an apparatus which adjusts a signal read from an optical disc in order to obtain stable binary data. The signal adjustment method comprises (a) detecting a period of an input signal of a predetermined code; (b) determining whether the detected period is smaller than a predetermined value; and (c) if the detected period is determined to be smaller than the predetermined value, adjusting the input signal so that its period equals the predetermined value, and outputting the input signal. The signal adjustment method and apparatus of the present invention reduce errors and improve system performance, when a signal input to the binary processor does not meet its code feature.

14 Claims, 5 Drawing Sheets

METHOD AND APPARATUS FOR ADJUSTING DATA RECORDED ON OPTICAL DISC

CROSS-REFERENCE TO RELATED APPLICATIONS

This application claims the benefit of Korean Patent Application No. 2003-33447, filed May 26, 2003, in the Korean Intellectual Property Office, the disclosure of which is incorporated herein by reference.

BACKGROUND OF THE INVENTION

1. Field of the Invention

The present invention relates to the reproduction of data recorded on an optical disc, and more particularly, to a method and apparatus which adjust a signal read from an optical disc in order to obtain stable binary data.

2. Description of the Related Art

Binary data is recorded on the surface of optical discs such as CDs (Compact Discs) or DVDs (Digital Versatile Discs). Recorded binary data can be reproduced by reading an optical signal obtained by reflecting a laser beam off the surface of an optical disc. The data recorded on optical discs is binary data, but the signals read from the optical discs are RF(Radio Frequency) signals, which are analog signals. Therefore, a process to convert RF signals into a digital signals is needed.

For restoration of data stored on an optical disc, a binary processing unit and a PLL (Phase Locked Loop) circuit are commonly used. The binary processing unit can include a sign detection circuit, a run length correction processor, or a Viterbi decoder. It is generally believed that binary processing units using Viterbi decoders are superior. However, the higher the recording density of the optical disc, the more frequent the data stored in the optical disc cannot be reproduced without error, even when using a Viterbi decoder.

SUMMARY OF THE INVENTION

The present invention provides a signal adjustment method and apparatus which can be used for error free reproduction of data stored on an optical disc. The data is reproduced by adjusting and inputting the data to a Viterbi decoder having a binary processing unit which converts the data into binary data.

According to an aspect of the present invention, there is a signal adjustment method including, detecting the period of an input signal of a predetermined code, determining whether the detected period is smaller than a predetermined value, and if the detected period is smaller than the predetermined value, adjusting the input signal, so that its period equals the predetermined value, and outputting the input signal.

In an additional aspect of the present invention, detecting the period of an input signal of a predetermined code includes, sequentially receiving data sampled from the input signal of the predetermined code, averaging every two consecutive data samples, and determining the period based on how many consecutive averages have the same sign.

According to another aspect of the present invention, there is a signal adjustment method including, receiving sample values a, b, c, d, and e, sampled from an input signal, embodied as RLL (2, 10) code, calculating a first average value of the sample values a and b, a second average value of b and c, a third average value of c and d, and a fourth average value of d and e, and if the signs of the calculated first, second, and third average values are +, −, + or −, +, − respectively, adjusting value a and value d.

If the signs of the calculated first, second, third and fourth average values are +, −, −, + or −, +, +, − respectively, the period is determined to be 2T. In this case, the absolute value of the first average value is compared with the absolute value of the fourth average value, and if the absolute value of the first average value is smaller the value a is adjusted, and if the absolute value of the fourth average value is smaller the value e is adjusted.

According to another aspect of the present invention, there is a signal adjustment method including, receiving sample values a, b, c, and d, sampled from an input signal embodied as RLL (1, 7) code, calculating a first average value of the sample values a and b, a second average value of b and c, and a third average value of c and d, and if the signs of the calculated first, second, and third average values are +, −, + or −, +, −, respectively, the absolute value of the first average value is compared with the absolute value of the third average value, and if the absolute value of the first average value is smaller, adjusting value a, and if the absolute value of the third average value is smaller, adjusting value d. If the absolute values of the first and third average values are equal, either value a or value d may be adjusted. In an additional aspect of the present invention, when the absolute values of the first and third average values are equal, both value a and value d may be adjusted.

According to another aspect of the present invention, there is a signal adjustment apparatus comprising: a waveform regulator which detects the period of an input signal having a predetermined code, determines whether the detected period is smaller than a predetermined value, and if the detected period is smaller than the predetermined value, adjusts the input signal, and then outputs the input signal; and a Viterbi decoder which receives the output of the waveform regulator and performs decoding.

In a further aspect of the present invention, the above-described waveform regulator comprises: a period detector which detects the period of the input signal having a predetermined code; a determinator which determines whether the detected period is smaller than the predetermined value; and an adjustor which adjusts the input signal if the detected period is smaller than the predetermined value, and then outputs the input signal.

According to another aspect of the present invention, there is a computer readable medium to store a program that executes the above-described method in a general-purpose computer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
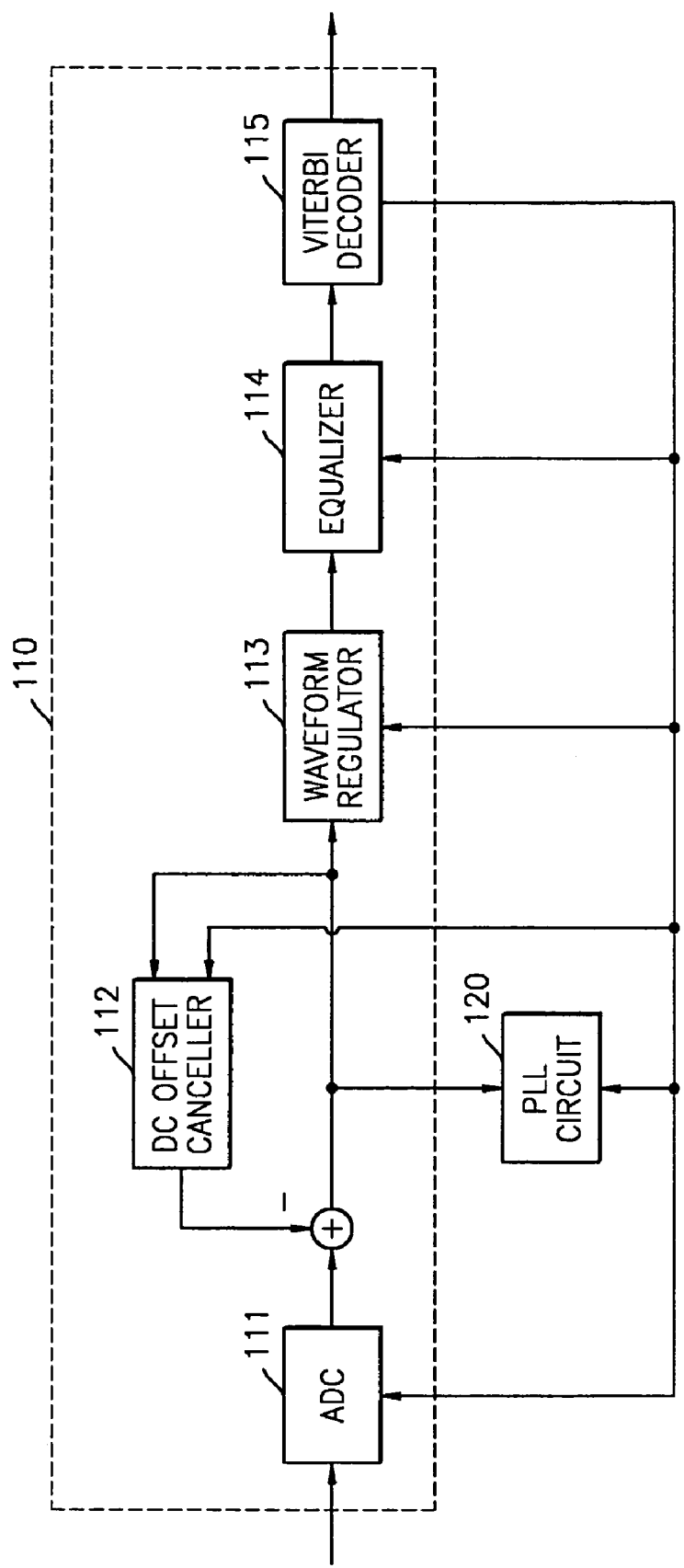
FIG. 1 is a block diagram of an apparatus which converts a signal read from an optical disc into binary data.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus which converts a signal read from an optical disc into binary data.

To convert a signal read from an optical disc into binary data, a binary processor 110 and a PLL circuit 120 are used. The PLL circuit 120 synchronizes a system clock signal with an input signal and outputs the system clock signal. The binary processor 110 comprises an analog-to-digital converter (ADC) 111, a direct current (DC) offset canceller 112, a waveform regulator 113, an equalizer 114, and a Viterbi decoder 115.

An RF signal read from an optical disc is input to the ADC 111 and output as a digital signal. The DC offset canceller 112 isolates and removes a DC offset signal included in the digital signal output from the ADC 111. The waveform regulator 113 receives the digital signal from which the DC offset is removed, and if necessary, adjusts the input signal waveform to fit a code feature of data recorded on the optical disc.

An RLL (2, 10) code or an RLL (1, 7) code are often used for an optical disc. RLL is a data recording method and stands for Run Length Limited. In the case of the RLL (2, 10) code, the minimum distance signal is a 3T signal whose period is 3 times a basic pit period. In the case of the RLL (1, 7) code, the minimum distance signal is a 2T signal whose period is 2 times the basic pit period. Therefore, when a waveform is normally recorded and reproduced from an optical disc using the RLL (2, 10) code, a signal smaller than a 3T signal, such as a 2T or 1T signal, cannot be detected. Likewise a signal smaller than a 2T signal cannot be detected from an optical disc using the RLL (1, 7) code.

The equalizer 114 reproduces a high frequency component of the waveform regulator 113 output signal and removes a pulse distribution. The equalizer 114 is a kind of Finite Impulse Response (FIR) filter, and it may have a fixed or variable filter coefficient.

Figure 2A:
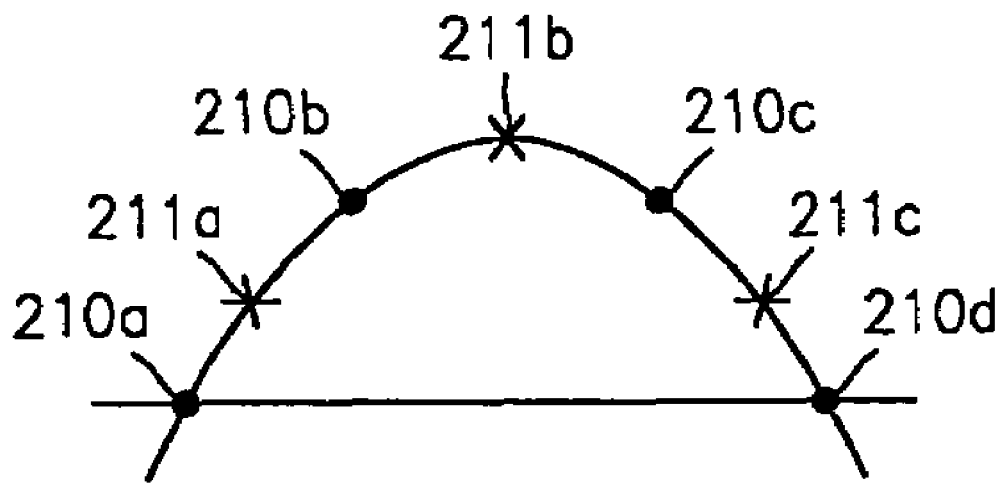
FIGS. 2A and 2B show examples of waveforms normally detected.
Figure 2B:
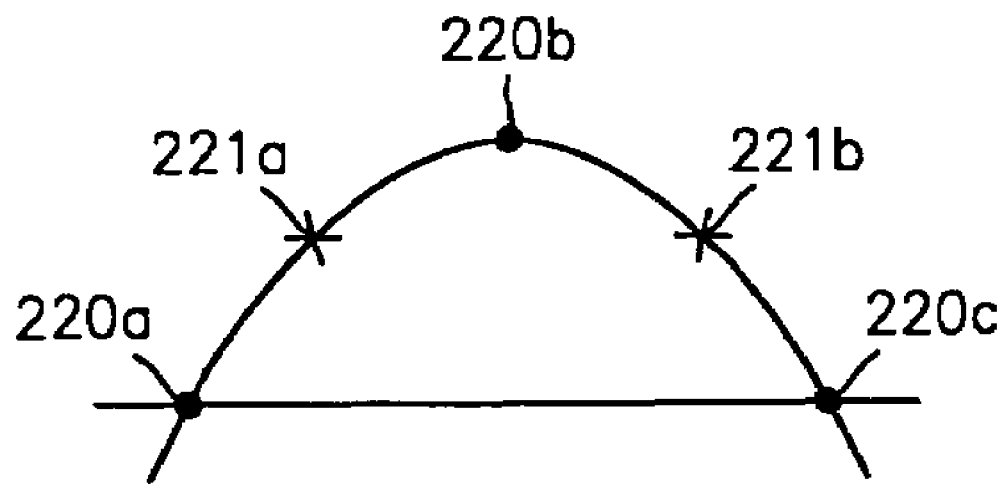

FIGS. 2A and 2B show examples of error free waveforms.

FIG. 2A shows the waveform of RLL (2, 10) code signal. A determination of whether the period is 3T or not is made according to the signs of the calculated average values of the sampled values.

Items 210a through 210d are marked with circles that represent the sampled values. Items 211a through 211c are marked with crosses that represent the average values of the sampled values. In FIG. 2A, the period is determined to be a 3T because the sampled values 211a through 211c have three consecutive positive (+) values.

If the detected period is smaller than 3T, such as 2T or 1T, the sampled values are adjusted. When there are sampled values a, b, c, d, and e of the input signal embodied as RLL (2, 10) code, a first average value of sampled values a and b, a second average value of b and c, a third average value of c and d, and a fourth average value of d and e are calculated. If the signs of the above-calculated first, second and third average values are +, −, + or −, +, − respectively, the period is determined to be 1T and value a and value d are adjusted.

If the signs of the calculated first, second, third and fourth average values are +, −, −, + or −, +, +, − respectively, the period is determined to be 2T. In this case, the absolute value of the first average value is compared with the absolute value of the fourth average value, and if the absolute value of the first average value is smaller the value a is adjusted, and if the absolute value of the fourth average value is smaller the value e is adjusted. If the absolute values of the first and fourth average values are equal, either value a or value e may be adjusted.

In this case, an adjusted value a is calculated by multiplying the first average value by −2 and subtracting b, an adjusted value d is calculated by multiplying the third average value by −2 and subtracting c, and an adjusted value e is calculated by multiplying the fourth average value by −2 and subtracting d.

FIG. 2B shows the waveform of RLL (1, 7) code signal whose period is 2T. That is, the period is 2T because the average values 221a and 221b of sampled values 220a through 220c have two consecutive + values. However, the signal can be distorted by noise leading to errors in the minimum distance signal.

If the detected period is smaller than 2T, i.e., 1T, the sampled values are adjusted as illustrated. When the sampled values a, b, c, and d of the input signal are embodied as RLL (1, 7) code, the first average value of a and b, the second average value of b and c, and the third average value of c and d are calculated. If the signs of the calculated first, second, and third average values are +, −, + or −, +, − respectively, the period is determined to be 1T.

In this case, the absolute value of the first average value is compared with the absolute value of the third average value, and if the absolute value of the first average value is smaller, the value a is adjusted, and if the absolute value of the third average value is smaller the value d is adjusted. If the absolute values of the first and third average values are equal, either value a or value d may be adjusted. The adjusted value a is calculated by multiplying the first average value by −2 and subtracting b and the adjusted value d is calculated by multiplying the third average value by −2 and subtracting c.

Figure 3A:
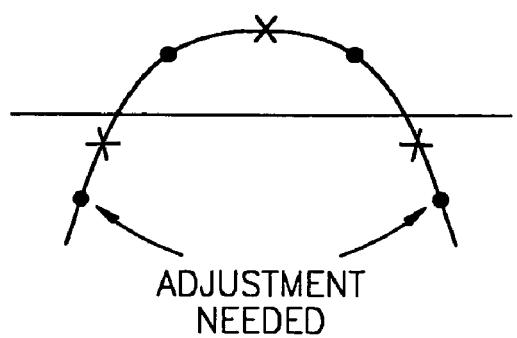
FIGS. 3A through 3C show a case in which an error occurs when a minimum distance signal is detected due to distortion of RLL(2, 10) code.
Figure 3B:
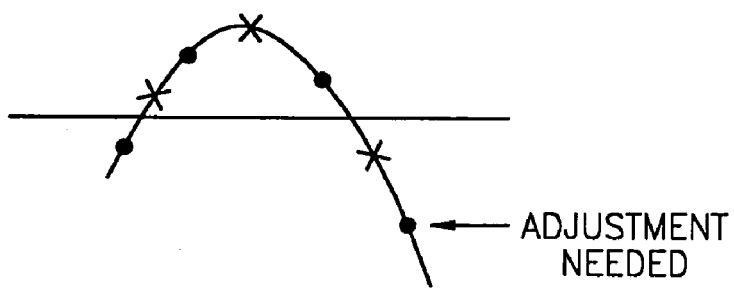
Figure 3C:
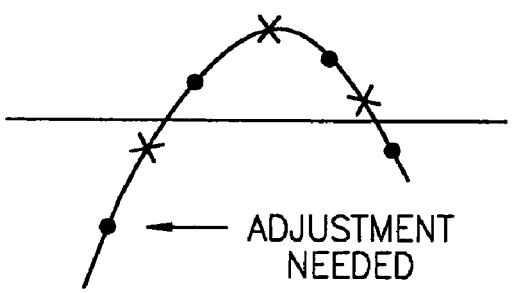

FIGS. 3A, 3B, and 3C show cases in which an error occurs due to distortion of the RLL (2, 10) code when the minimum distance signal is detected.

FIG. 3A shows a case in which a signal that should be detected as 3T is detected as 1T, and FIGS. 3B and 3C show cases in which the signal is detected as 2T When the signal is detected as 1T, as shown in FIG. 3A, the front and the rear sampling values of the signal are adjusted. When the signal is detected as 2T as shown in FIGS. 3B and 3C, either the front or the rear sampling value, whichever has the larger absolute value, is adjusted. If the absolute values of the front and the rear sampling values are equal, then either sampling value may be adjusted.

Figure 4A:
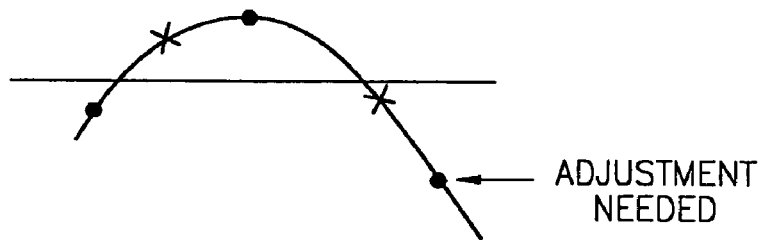
FIGS. 4A and 4B show a case in which an error occurs when a minimum distance signal is detected due to distortion of RLL(1, 7) code.
Figure 4B:
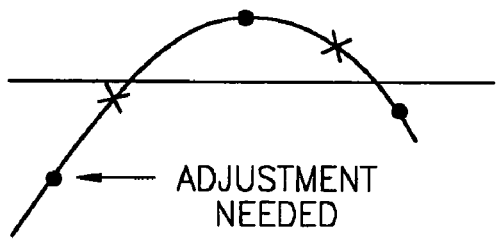

FIGS. 4A and 4B show a case in which an error occurs due to distortion of the RLL (1, 7) code when the minimum distance signal is detected.

When the signal is detected as 1T, as shown in FIGS. 4A and 4B, either the front or the rear sampling value of the signal must be adjusted. That is, the sampling value with the larger absolute value is adjusted. If the absolute value of the sampling values is equal, either the front or the rear sampling value may be adjusted.

Figure 5:
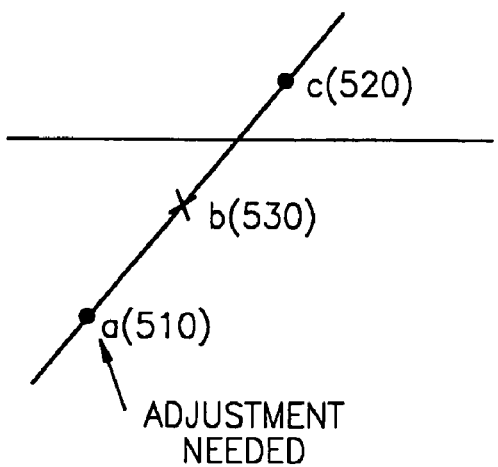
FIG. 5 illustrates how an adjustment value is calculated.

FIG. 5 illustrates how the adjustment value is calculated.

In FIG. 5, item a 510 and item c 520 are sampling values and item a 510 is the data to be adjusted. The sign of item b 530, which is the average value of item a 510 and item c 520, defines the period of the signal. However, if an error occurs in the input signal, the sign of item b 530 may be wrongly detected. In such a case, the absolute value of item b 530 is left as it is and the sign of item b 530 is changed, and then the value of item a 510 is newly calculated. That is, the average value b=(a+c)/2, therefore a=2b−c. If the sign of the value of item b 530 is changed, the value of item a 510 which is newly made is given by a=−2b−c.

Figure 6:
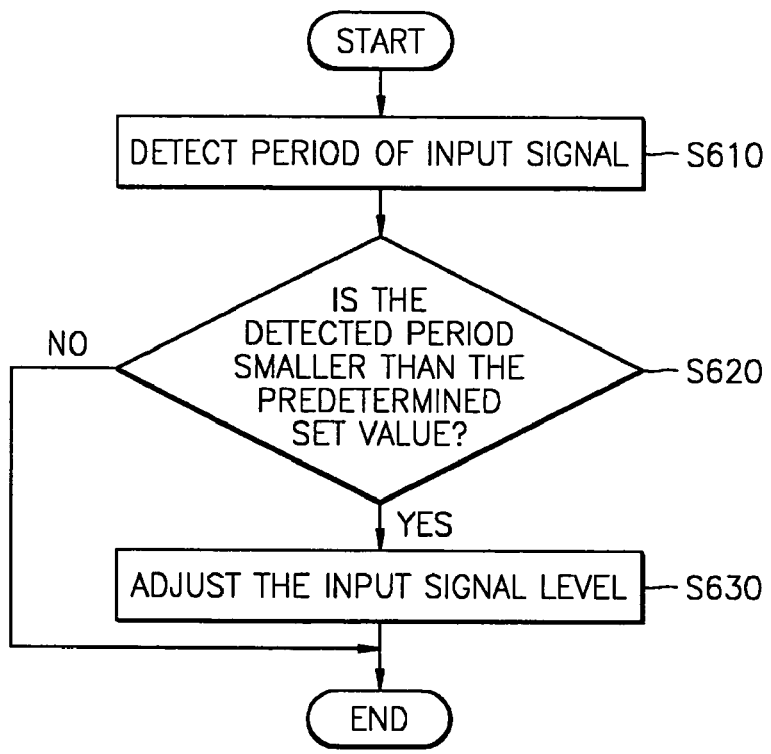
FIG. 6 is a flowchart of the signal adjustment method of the present invention.

FIG. 6 is a flowchart of the signal adjustment method of the present invention.

Referring to FIG. 6, initially, the period of an input signal made of a predetermined code is detected (S610). Next, it is determined if the detected period is smaller than a predetermined set value (S620). Finally, if a value of the input signal is smaller than the predetermined set value, the value of the input signal is adjusted and then output (S630). The input signal value is adjusted as described above with reference to FIG. 3A through FIG. 5.

Figure 7:
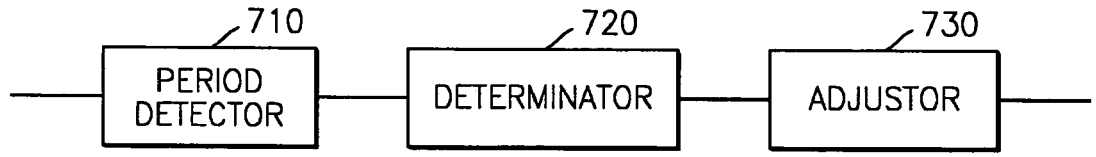
FIG. 7 is a block diagram of a waveform regulator performing the signal adjustment method of the present invention.

FIG. 7 is a block diagram of the waveform regulator described-above that performs the signal adjustment method of the present invention.

The waveform regulator comprises a period detector 710, a determinator 720, and an adjustor 730. The period detector 710 detects the period of the input signal of a predetermined code. Examples of the predetermined code are RLL (2, 10) and RLL (1, 7) as described above. The period detector 710 detects the period of the input signal using the method described above with reference to FIGS. 2A and 2B. The determinator 720 determines if the detected period is smaller than the predetermined set value. The predetermined set value is 3T in the case of using RLL (2, 10) code, and 2T in the case of using RLL (1, 7) code. The adjustor 730 adjusts the value of the input signal if the determinator 720 determines that the detected period is smaller than the predetermined set value. The method by which the adjustor 730 adjusts the input signal value is described with reference to FIG. 5. The adjustor 730 then outputs the input signal.

The present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having a computer readable program code embodied therein for causing a number of computer systems connected via a network to effect distributed processing.

As described above, the signal adjustment method and apparatus of the present invention reduces errors and can improve optical disc system performance, when a signal input to the binary processor does not meet the code feature.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A signal adjustment method comprising:
   detecting a period of an input signal encoded using a Run Length Limited (RLL) code by sequentially receiving data sampled from the input signal of the RLL code, averaging every two consecutive data samples, and determining the period which is multiple times the basic pit period based on how many consecutive averages have the same sign;
   determining whether the detected period which is multiple times the basic pit period is smaller than a minimum run length of the RLL code;
   if the detected period which is multiple times the basic pit period is determined to be smaller than the minimum run length of the RLL code, adjusting the input signal so that the period which is multiple times the basic pit period of the input signal equals the minimum run length of the RLL code and outputting the adjusted input signal; and
   reproducing data based on the outputted adjusted input signal.

2. The signal adjustment method of claim 1, wherein the RLL code is RLL (2, 10) code.

3. The signal adjustment method of claim 2, wherein the minimum run length of the RLL code is 3T.

4. The signal adjustment method of claim 1, wherein the RLL code is RLL (1, 7) code.

5. The signal adjustment method of claim 4, wherein the minimum run length of the RLL code is 2T.

6. A signal adjustment method comprising:
   receiving sample values a, b, c, d, and e sequentially sampled from an input signal embodied as Run Length Limited (RLL) (2, 10) code;
   calculating a first average value of sample values a and b, a second average value of sample values b and c, a third average value of sample values c and d, and a fourth average value of sample values d and e so as to determine a period which is multiple times a basic pit period;
   if the signs of the calculated first average value, second average value, and third average values are +, −, + or −, +, − respectively, adjusting value a and value d so as to make the period which is multiple times a basic pit period to be equal to a minimum run length of the RLL code;
   outputting the adjusted signal; and
   reproducing data based on the outputted adjusted signal.

7. The signal adjustment method of claim 6, wherein if the signs of the calculated first, second, third, and fourth average values are +, −, −, + or −, +, +, −, respectively, the absolute value of the first average value is compared with the absolute value of the fourth average value, and if the absolute value of the first average value is smaller, value a is adjusted and if the absolute value of the fourth average value is smaller, value e is adjusted.

8. The signal adjustment method of claim 7, wherein value a is adjusted by multiplying the first average value by −2 and then subtracting b, and value e is adjusted by multiplying the fourth average value by −2 and subtracting d.

9. The signal adjustment method of claim 6, wherein value a is adjusted by multiplying the first average value by −2 and then subtracting b, and value d is adjusted by multiplying the third average value by −2 and then subtracting c.

10. A signal adjustment method comprising:
    receiving sample values a, b, c, and d sequentially sampled from an input signal embodied as Run Length Limited (RLL) (1, 7) code;
    calculating a first average value of sample values a and b, a second average value of b and c, and a third average value of c and d so as to determine a period which is multiple times a basic pit period;
    if the signs of the calculated first average value, second average value, and third average value are +, −, + or −, +, −, respectively, comparing the absolute value of the first average value with the absolute value of the third average value, and if the absolute value of the first average value is smaller, adjusting value a, and if the absolute value of the third average value is smaller, adjusting value d, so as to make the period which is multiple times a basic pit period to be equal to a minimum run length of the RLL code;

outputting the adjusted signal; and reproducing data based on the outputted adjusted signal.

11. The signal adjustment method of claim 10, wherein value a is adjusted by multiplying the first average value by −2 and subtracting b, and value d is adjusted by multiplying the third average value by −2 and subtracting c.

12. A signal adjustment apparatus comprising:

a waveform regulator which:

detects a period of an input signal of a Run Length Limited (RLL) code by sequentially receiving data sampled from the input signal of the RLL code, averaging every two consecutive data samples, and determining the period which is multiple times the basic pit period based on how many consecutive averages have the same sign, determines whether the detected period which is multiple times the basic pit period is less than a minimum run length of the RLL code, adjusts the input signal if the detected period which is multiple times the basic pit period is smaller than the minimum run length of the RLL code, and outputs the adjusted input signal; and a Viterbi decoder which receives the output of the waveform regulator and performs decoding.

13. The signal adjustment apparatus of claim 12, further comprising an equalizer to reproduce a high frequency component of the waveform regulator output signal and remove a pulse distribution.

14. The signal adjustment apparatus of claim 12, wherein the waveform regulator comprises:

a period detector to detect the period of the input signal, the input signal having been generated according to the predetermined code;

a determinator to determine if the detected period is smaller than the predetermined value; and an adjustor to adjust the input signal if the detected period is smaller than the predetermined value and to output the adjusted input signal.

\* \* \* \* \*